United States Patent [19]

Sparks

[11] Patent Number: 4,965,811
[45] Date of Patent: Oct. 23, 1990

[54] ADAPTIVE TIMING

[75] Inventor: Thomas C. Sparks, Nepean, Canada

[73] Assignee: Bell-Northern Research Ltd., Ottawa, Canada

[21] Appl. No.: 209,629

[22] Filed: Jun. 20, 1988

[51] Int. Cl.$^5$ ............................................. H04L 7/04
[52] U.S. Cl. ...................................... 375/109; 370/103
[58] Field of Search ...................... 375/107, 109, 111;
370/100.1, 105.3, 105.2, 103; 455/51, 69;
371/20.1, 20.5, 47.1

[56] References Cited

U.S. PATENT DOCUMENTS

| | | | |
|---|---|---|---|
| 3,588,703 | 6/1971 | Sorkin | 375/109 |
| 3,603,932 | 9/1971 | Kerr et al. | 375/109 |
| 4,494,211 | 1/1985 | Schwartz | 375/107 |
| 4,602,375 | 7/1986 | Inukai | 370/105.3 |
| 4,653,049 | 3/1987 | Shinmyo | 370/103 |
| 4,682,327 | 7/1987 | Okumura et al. | 370/100 |
| 4,757,521 | 7/1988 | Korsky et al. | 375/109 |

OTHER PUBLICATIONS

Circuit Design and Transmission Performance for ISDN Basic Interfce, Okumura, Yamamoto and Kuribayashi: NTT Electrical Communications Laboratories, pp. 1651-1655.
A New Phase-Locked Oscillator Adaptable to Input Signals with Periodical Phase Jumps, Okumura, Hayashi and Inoue: Proceedings of ISCAS 85, pp. 599-602.

Primary Examiner—Douglas W. Olms
Assistant Examiner—Marianne Huseman
Attorney, Agent, or Firm—Morrison Law Firm

[57] ABSTRACT

In some digital communications systems, such as the Integrated Services Digital Network (ISDN), problems may occur in recovering timing from signals generated by several terminals located varying distances from a common transmitter. Timing recovery is facilitated by detecting a marker of a frame transmitted to the several terminal equipments, detecting a corresponding marker receives shortly afterwards from one of the terminal equipments; and sampling the received digital signal at a sampling instant delayed relative to a specific feature of the received marker, for example, a zero crossing immediately following a frame bit. Preferably, the delay between the sampling instant and the occurrence of the specific feature used as a reference point is proportional to the time elapsed between detection of the outgoing or transmitted marker and detection of the incoming or received marker and hence proportional to the round trip propagation time.

47 Claims, 15 Drawing Sheets

TR= TERMINATING RESISTOR

TR= TERMINATING RESISTOR

TR= TERMINATING RESISTOR

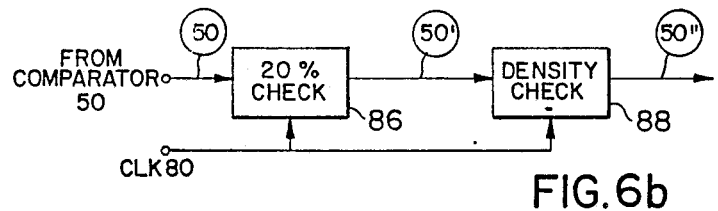
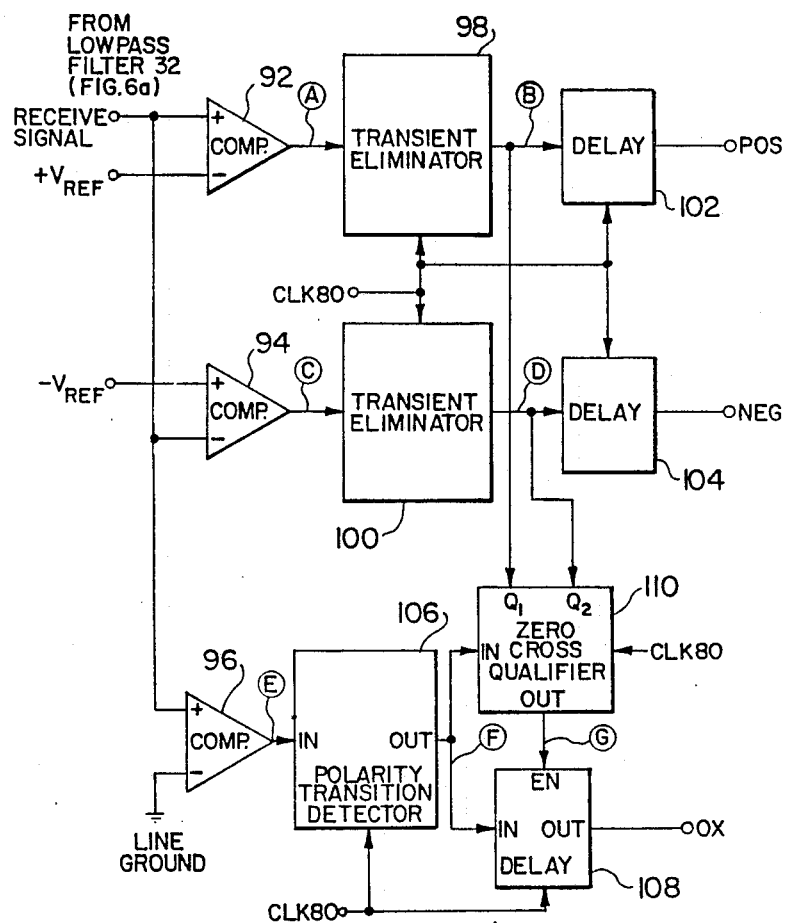

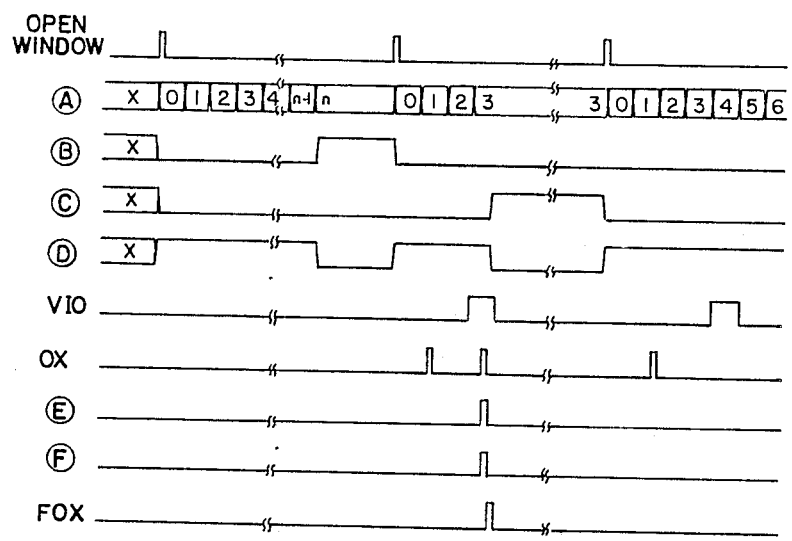
X IS UNDETERMINED   FIG. 13
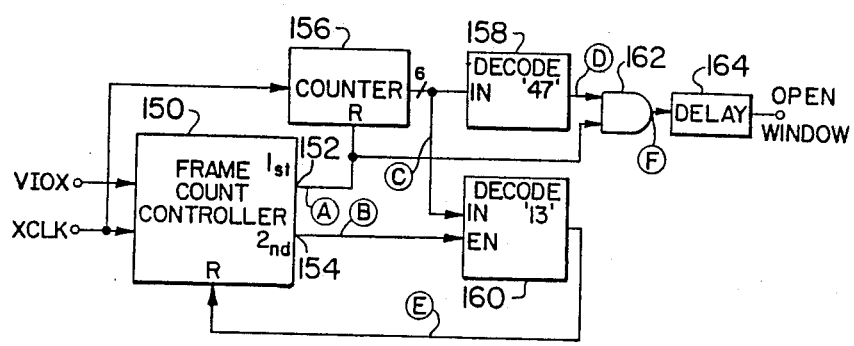
FIG. 14

ADAPTIVE TIMING

The invention relates to an apparatus and a method for transmitting and receiving of digital signals, and is especially, but not exclusively, applicable to the recovery of timing from digital signals in an Integrated Services Digital Network (ISDN).

BACKGROUND OF THE INVENTION

In an Integrated Services Digital Network (ISDN), as defined in the recommendations of the International Telegraph and Telephone Consultative Committee (CCITT), an ISDN telephone subscriber loop includes a U-interface and a T-interface. The U-interface loop includes a two-wire full duplex digital signal transmission line, and extends from a telephone central office or exchange termination (ET) to a network termination (NT). The network termination couples the signals between the U-interface and the T-interface, which includes a four-wire digital signal transmission line for providing transmit and receive signal paths between the network termination (NT) and the terminal equipment ($T_E$), usually including at least one, and as many as eight, ISDN telephone sets.

The network termination (NT) must be able to correlate the information being received on the receive signal path, from the terminal equipment (TE), with the information which it has just transmitted to the TE on the transmit signal path. In a so-called fixed timing recovery system, the network termination identifies the beginning of the frame being transmitted, delays a predetermined length of time (typically less than a bit period) and then samples the incoming receive path for the corresponding receive signal. This arrangement is not satisfactory, however, because it arbitrarily fixes the maximum loop length to less than the bit period and, where there are several TE's, limits their separation.

It is desirable to have a network termination timing recovery arrangement which is able to accommodate the different configurations envisaged by ISDN T-interface standards, and which will be able to extract the timing despite the different mean phases of the signals received from plural terminal equipments (TE).

Recommended configurations and operating parameters for the T-interface are defined in the CCITT Red Book, layer 1 specification I.430, published 1985, updated 1986, and American National Standard T1.XYZ.1918Y. (ANSI specification), in both documents specifically at Section 8.6.3. These recommendations entertain provision of up to four kinds of Network Termination to support the various T-interface configurations. Those specified are for Short Passive Bus, Point-to-Point, Extended Passive Bus, and both Point-to-Point and Passive Bus. The round trip delay for Point-to-Point and Extended Passive Bus configurations ranges from 10 to 42 microseconds. For the Short Passive Bus, the round trip delay is in the range of 10 to 14 microseconds, and for the combination of Point-to-Point and Passive Bus, the round trip delay should be in the range of 10 to 13 microseconds for Passive Bus and 10–42 microseconds for Point-to-Point. In the case of the Extended Passive Bus, the differential delay between signals from different termination equipments is in the range 0 to 2 microseconds.

Each Network Terminal (NT) will synchronize its signal transmitted on the transmit path of the T-interface with the signal it is receiving on the U-interface. The difficulty lies in synchronizing the signals being received on the receive path of the T-interface because they will have been originated by different terminal equipments, and so will have different amounts of jitter and phase shift. The problem of adapting timing recovery for different configurations has been addressed by Yasuyuki Okumura, Kazuhiro Hayashi, and Yuji Inoue in a paper entitled "A New Phase Locked Oscillator Adaptable to Input Signals With Periodical Phase Jumps" Proceedings of ISCAS 85,IEEE; by Yasuyuki Okumura, Takashi Yamamoto, and Masasha Kuribayashi, in a paper entitled "Circuit Design and Transmission Performance for ISDN Basic Interface", IEEE, 1986; and by Yasuyuki Okumura and Kazuhiro Hayashi in U.S. Pat. No. 4,682,327 entitled "Polyphase Phase Lock Oscillator", issued July 21, 1987, and incorporated herein by reference. They proposed an adaptive timing extraction method using a polyphase phase-locked oscillator. This oscillator comprises a phase-locked loop for each individual channel which extracts the retiming clock pulse from the channel independently, following segregation of the input signals for each channel by gate signals generated using the marker from the received signal.

This arrangement is not entirely satisfactory because it presumes that each channel will be allocated to a single terminal equipment and moreover requires complex circuitry.

The present invention seeks to ameliorate these problems.

According to one aspect of the present invention, apparatus for transmitting digital signals by way of a transmit path to one or more terminal equipments, and for receiving digital signals by way of a shared receive path from such terminal equipments, said digital signals comprising frames each having a marker comprises:
  (i) first means for detecting a marker of a frame transmitted on said transmit path;
  (ii) second means operable in response to detection of said marker in the transmitted signal for detecting a corresponding marker of a frame of a digital signal received on said receive path; and
  (iii) third means for sampling said received digital signal at a sampling instant determined relative to a specific feature of said received marker.

In preferred embodiments, the aforesaid third means may comprise means for determining the time interval between detection of the transmitted marker, and detection of the received marker and means for variably delaying said sampling instant in dependence upon the duration of such time interval.

The variable delaying means may comprise means for providing a plurality of clock signals phase-displaced relative to one another and to a reference clock, and means for selecting one of said plurality of clock signals for determining said sampling instant. Means for synchronizing the reference signal to said received signal may be provided.

Advantageously, the apparatus may comprise means for detecting the presence or absence of information in the transmitted digital signal. Then the second means may be operative to detect a recurrent feature in the received signal, other than the aforesaid marker, and produce a corresponding signal which can be used in determining the sampling instant. Such corresponding signal would be selected when there was no information, and hence no marker, in the transmitted signal.

The range of variation of the sampling instant, relative to the zero crossing, is conveniently in the range 35–90 percent and preferably less than one half of a bit period.

According to a second aspect of the invention, a method of recovering timing from digital signals received from one or more terminal equipments to which a corresponding digital signal has been transmitted, said digital signals comprising frames each having a marker, comprises the steps of:

(i) detecting a marker of a frame of a digital signal being transmitted to said terminal equipments;

(2) in response to detection of said marker, enabling detection means to detect a corresponding marker in a signal received from one of said terminal equipments; and (3) sampling said received signal at a sampling instant that is determined relative to a specific feature of said received marker.

The step of sampling the received signal may comprise determining the time interval between detection of the transmitted marker and detection of the received marker and variably delaying said sampling instant in dependence upon said time interval. The variable delaying step may comprise the steps of providing a reference signal synchronized to said received signal, providing a plurality of clock signals phase-displaced relative to one another, and selecting one of said plurality of clock signals for determining said sampling instant. Advantageously, the transmitted signal is monitored for the presence or absence of information and, in addition to detecting the marker, an alternative recurrent feature of the received signal is detected when no information is present in the transmitted signal, and hence no marker, the sample instant is determined using a clock signal derived with reference to the recurrent feature of the received signal.

In both aspects, the marker may comprise a first bit that is a violation of the transmission code, for example, a bipolar violation of an inverted AMI code. In an ISDN signal, the marker may be the frame marker bit and be followed by a second bit of opposite polarity, the second bit serving to maintain dc balance. The aforesaid specific feature of the marker from which the sampling instant is determined may then be the zero crossing between the first and second bits.

BRIEF DESCRIPTION OF THE DRAWINGS

FIGS. 6a and 6b are diagrams of a reference voltage selector of the circuit shown in FIG. 5;

FIG. 8 is a block diagram of a demodulator for the apparatus shown in FIG. 5;

FIG. 13 is a timing diagram for the marker zero-crossing detector;

FIG. 14 is a block diagram of the frame marker detector shown in FIG. 5;

DESCRIPTION OF A PREFERRED EMBODIMENT

Figure 1:
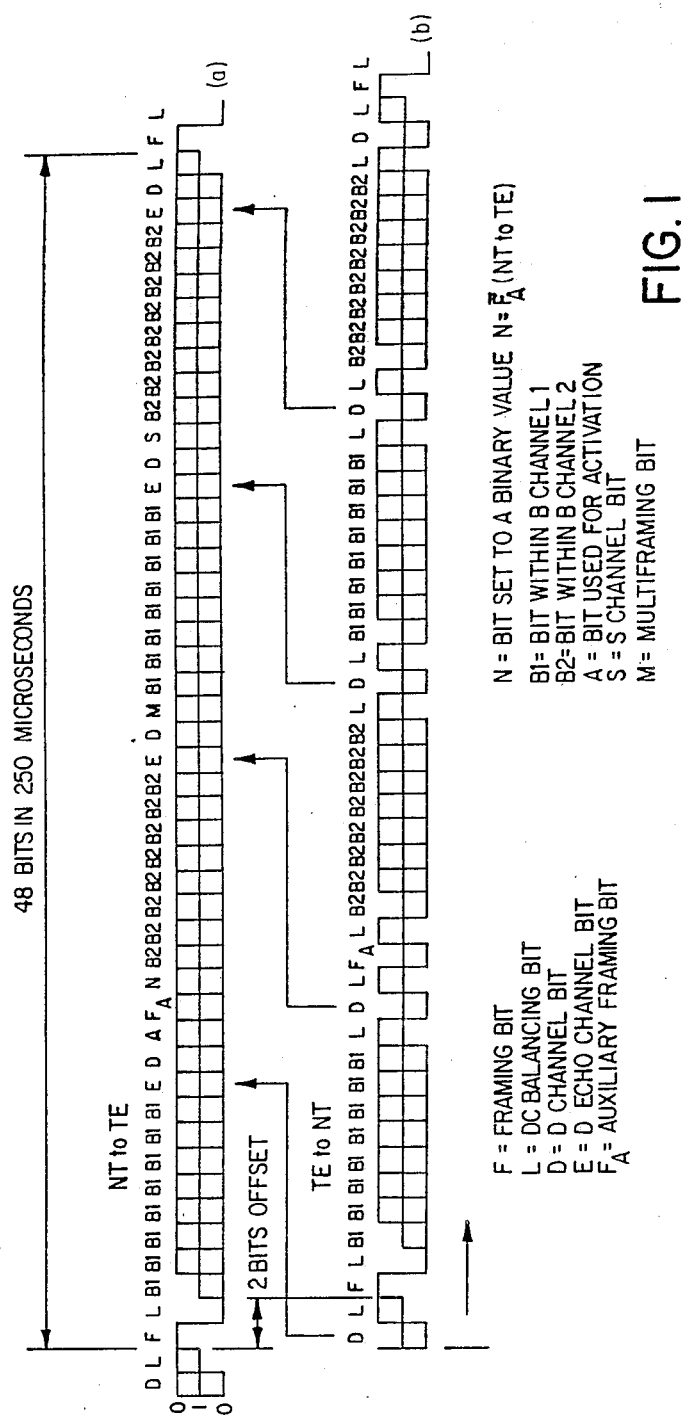
FIG. 1 is a graphical illustration of the ISDN recommended standard signal frame structure given in Appendix C of the ANSI specification.

The ISDN signal depicted in FIG. 1 is usually referred to as 2B+D, since each 125 microsecond frame comprises two 'B' channels of 64 kb/second data/voice, and one 'D' channel of 16 kb/second signalling. The digital signal shown in FIG. 1(a) represents the "transmit" signal as transmitted onto the transmit path by the transmitter of the network termination NT. The frame commences with a frame marker bit F, which comprises a violation of the line code — in this case so-called inverted AMI (Alternate Mark Inversion), where binary 0's are represented as alternating pulses. Immediately following the frame marker bit F is a d.c. balancing bit L, of opposite polarity to the frame marker bit F so as to maintain d.c. balance. Eight data/voice bits B1 follow the d.c. balance bit L and are themselves followed by a D-echo-channel bit E then the D-channel bit itself, D. These E bits serve for D-channel contention by the TE's. The offset between the "worst case" received D bit from a terminal and transmit D-echo (E bit) limits the round trip delay.

An activation bit A follows the D-channel bit. The next bit, auxiliary frame marker bit $F_A$ is followed by alternate auxiliary framing bit N which is always the binary inversion of the $F_A$ bit. The $F_A$ bit is set to binary 1 every 5th frame to identify valid Q bit frames from the TE's. $B_2$ channel comprises eight data/voice bits $B_2$, followed by E and D bits, and then a multiframing bit M, which is a binary 1 each 20th frame, otherwise a binary 0 to group Q bits into nibbles.

A second $B_1$ channel of eight voice/data bits $B_1$ follows, then E and D bits followed by a sub-channel bit S. The S bit is used to send messages to the TE.

A second $B_2$ channel of eight voice/data bits $B_2$, follows, then E and D bits. The last bit is a frame d.c. balance bit L which ensures an even number of positive and negative pulses in the current frame.

The signal shown in FIG. 1(b) is received at the NT's receiver on the receive path, from the TE or TEs, and is shown offset optimally by 2 bits relative to the transmit signal. Its frame starts with a frame marker bit F, also a bipolar violation, and d.c. balance bit L. However, each channel (i.e., $B_1$, $B_2$, D, $F_a$) is individually d.c. balanced (by an L bit) since it could originate from a different TE.

Figure 2:
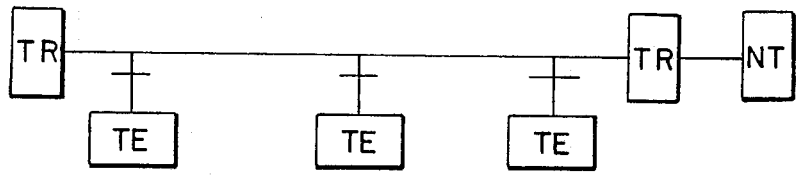
FIGS. 2, 3 and 4 are block schematic illustrations of three known wiring configurations for providing ISDN services using the signal frame structure illustrated in FIG. 1.
Figure 3:
Figure 4:
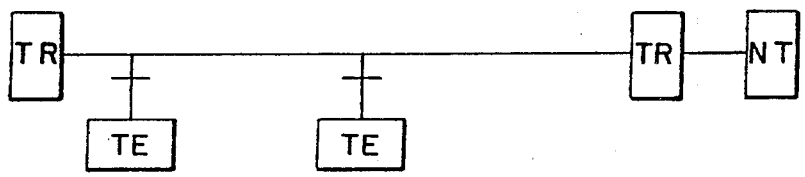

In each T interface, as shown in the FIGS. 2-4, the NT is synchronized from the clock rate of digital signals received from the U interface. The NT transmits signals as exemplified in FIG. 1 having about a 5.2 microsecond assertable period. These signals are transmitted at a standard rate of 192 kilobits per second, via one pair of wires, toward the TEs connected thereto. Each TE makes reference to the transmission rate for the purpose of transmitting signals, via the remaining pair of wires, toward the NT. When transmitting, each TE inserts 2 bits offset (delay) between the received F bit and transmitted F bit. This offset may include a −7% bit period phase deviation due to jitter or +7% phase deviation (jitter) in addition to a +8% bit period phase delay (for a total of +15%). This delay is in addition to the round trip delay, which of course depends upon the propagation time for signals to traverse the length of the transmission line between the NT and the TE. The propagation time plus the 2 bit offset yield an overall round trip delay time.

One example of a T interface is that of a Short Passive Bus (SPB) illustrated in FIG. 2. In a SPB configuration, up to eight TEs may be connected at random points along the T interface transmission line. This means that the NT receiver must cater for pulses arriving with different round trip delays from the various terminals. Hence the length limit for this configuration is a function of the maximum round trip delay. In particular, the round trip delay time should not exceed 14 microseconds. This value comprises the offset delay between frames of two bits (10.4 microseconds), the round trip delay of the unloaded bus installation (2 microseconds), the additional delay due to the load of the TEs (0.7 microseconds) and the maximum delay of the TE transmitter including jitter according to the CCITT specification (15% =0.8 microseconds). The minimum round trip delay is 2 bit offset minus seven per cent (10.4–0.4 microseconds). An appropriate NT may therefore take timing reference to the transmitter bit rate delayed by a fixed amount for sampling signals received from any TE connected to the T-interface. This is referred to as fixed timing in I.430 and ANSI specification.

A second example of a T interface is that of a Point to Point configuration (PPB), illustrated in FIG. 3. In a PPB configuration, the lower value of 10 microseconds is derived as for the SPB. The upper value of 42 microseconds comprises the 2-bit offset (10.4 microseconds), maximum 6 bits delay permitted due to the distance between NT and TE and the required processing time ($6 \times 5.2$ microseconds = 31.2 microseconds), and the fraction (+15%) of a bit period due to phase deviation between TE input and output ($0.15 \times 5.12$ microseconds =0.8 microseconds).

A TE is connected at only one location, that is, at the extreme end of the T interface transmission line remote from the NT. In this configuration a round trip delay of anywhere between about 10 and 42 microseconds is permitted, limited by the D-echo bits i.e., allowing time for the D bit of the received signal to be latched before the E bit of the transmit frame is set.

A third example of a T interface is that of an Extended-Passive Bus (EPB), illustrated in FIG. 4, which may be used at distances of the order of 100 meters to 1000 meters. In an EPB configuration TE connection points are restricted to a grouping at the far end of the line from the NT. The round trip delay may vary between 10 and 42 microseconds providing that in any one situation the differential variation in signal phase returned from the TEs, defined as that between the zero-crossings of signals from the different TEs, is no greater than 2 microseconds. The differential round trip delay is composed of a TE differential delay of 22% of a bit period (1.15 microseconds, the round trip delay of the unloaded bus installation (0.5 microseconds, line length 25 to 50 meters) and an additional delay due to the load of 4 TEs (0.35 microseconds). This configuration permits up to 4 TEs to be distributed along the T interface line from the extreme remote end of the line back toward the NT a distance about half of that permitted in the SPB configuration. The NT in this configuration is similar to the NT for the second example, the PPB, albeit with a detection window of less than 2 microseconds for sampling signals received from a TE.

The aforementioned ANSI specification, in FIGS. 19, 20, 21 and 8, gives eye diagrams for, respectively, (1) Short Passive Bus; (2) Passive Bus; (3) Extended Passive Bus, and (4) Point-to-Point configurations, from which the following information can be interpreted:

the possible phase deviation between zero crossings of signals from different TEs on (1) is $\phi$-4 microseconds, for (2) is $\phi$-3 microseconds and (3) is $\phi$-2 microseconds. Also, from the ANSI specification, the valid eye-openings for each type can be determined; range for (1) is 80% -95% of a bit period, as measured from the zero crossing point; range for (2) is 65% -95% of a bit period; range for (3) is 60%-90% of a bit period, and range for (4) is 35%-90% of a bit period.

What this demonstrates is that as the distance of the TEs from the NT increases, i.e., round-trip delay increases, the separation between TEs decreases and the range shifts from near the end of the bit period towards the mid-point.

For a single NT to handle all of these requirements, it must be able to tolerate all of these eye opening ranges. Embodiments of the invention do so by adaptive sampling.

Figure 5:
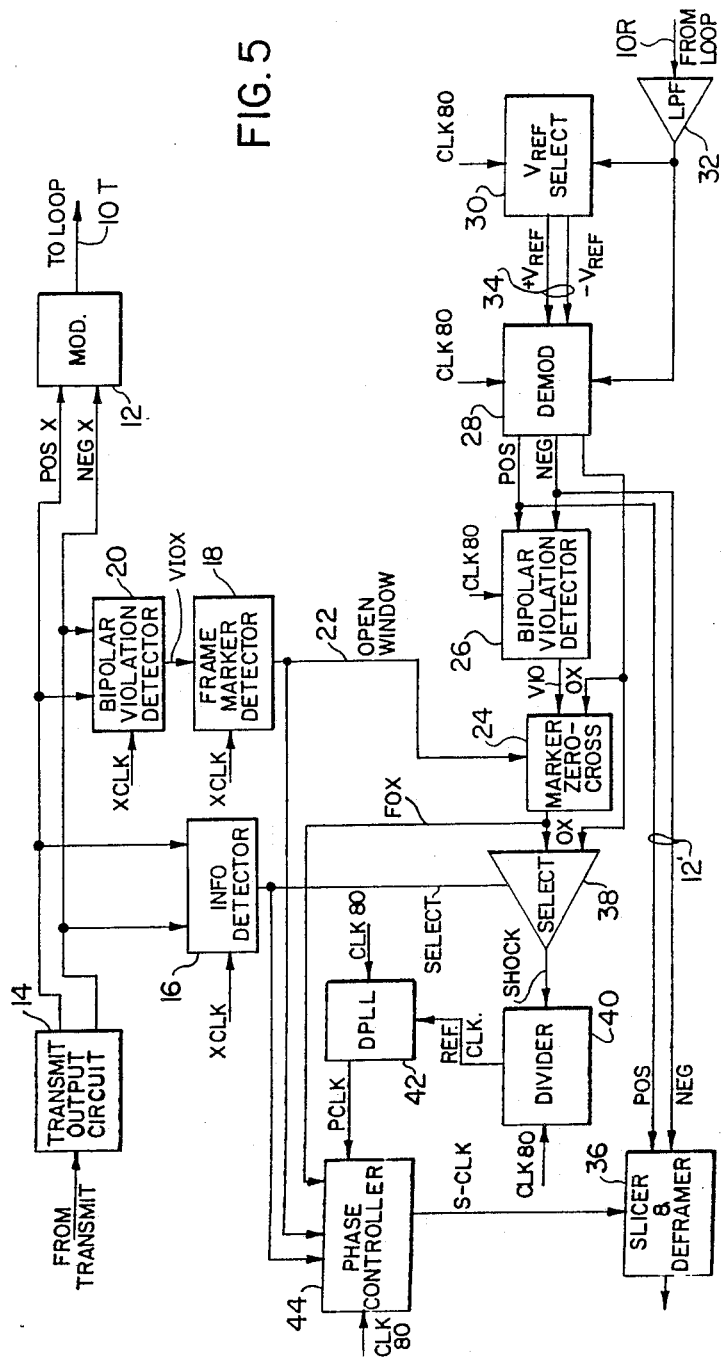
FIG. 5 is a block schematic diagram of apparatus for connection by way of a "transmit" loop and a "receive" loop to terminal equipment.

Referring now to FIG. 5, a timing recovery circuit of a network terminator apparatus is shown connected between a transmitter output line 10T and a receiver input line 10R. These lines comprise respective pairs of wires of a four-wire transmission line to which the terminal equipment is connected. The timing recovery in the terminal equipment (TE) is relatively straightforward since it receives signals from only one source. Accordingly, the terminal equipment will not be described in detail.

Transmitter line 10T is coupled by way of a signal modulator 12 to the output of a transmitter output circuit 14 of the network terminator. Two detectors 16 and 18, respectively, are also connected to the output of the transmitter output circuit 14, detector 18 by way of a bipolar violation detector 20. Detector 16 serves to detect the presence or absence of information in the transmitted signal for reasons which will be explained later. Marker detector 18 and bipolar violation detector 20 serve to detect the frame marker bit and generate a pulse as an "open window" signal. The bipolar violation detector 20 scans continuously for the occurrence of a bipolar violation and, when a violation occurs, marker detector 18 checks that a second, opposite polarity violation occurs within the next 14 bit periods; if so, the first violation deemed to be a frame marker and marker detector 18 a marker signal designated as "open window" signal which is supplied on line 22. Delay means 164 (shown in FIG. 14) at the output of AND gate 162 inserts a delay of slightly than two bits duration between detection of the transmitted marker bit and the transmission of the "open window" signal to compensate for the 2 bit period.

Line 22 is connected to an input of a marker zero crossing detector 24 which serves to scan the received signal to detect a corresponding frame marker pulse. The marker zero crossing detector 24 does not scan the received signal directly on line 12, but does so indirectly by way of a bipolar violation detector 26, demodulator 28 and voltage reference selector 30.

The signal arriving from the terminal equipment on line 12 passes through a low pass filter 32 before being applied to voltage reference selector 30. The amplitude of the received signal will vary because the attenuation of different lines will vary mainly because of differences in their lengths. The voltage reference selector 30 compares the received signal with a plurality of voltage levels and puts out two d.c. voltage levels $+V_{REF}$ and $-V_{REF}$ on line 34 connected to the input of demodulator 28. Another input of the demodulator 28 carries the received signal from low pass filter 32. Demodulator 28 compares the received signal with the two $V_{REF}$ signals (positive and negative) and produces two output signals POS and NEG. Thus, the analog "received" signal is compared with the voltage reference levels and produces two binary signals, one representing positive pulses, one representing negative pulses, which are outputted to the bipolar violation detector 26 and also to a slicer and deframer 36 which performs the sampling of the received signal. The demodulator 28 also applies a zero crossing signal OX, in the form of a pulse, to a selector 38 and the marker zero-crossing detector 24. Bipolar violation detector 26 detects any bipolar violations in the binary signals representing the received signal, and produces a signal VIO to marker zero crossing detector 24. As previously mentioned, the "open window" signal is also applied to marker zero-crossing detector 24.

The bipolar violations detected by bipolar violation detector 26 are not necessarily frame marker bipolar violations. The marker zero-crossing detector 24 will determine which of them correspond to frame markers, and will also determine the zero crossing point between the frame marker bit and the succeeding d.c. compensation bit, or balancing bit, and will provide an output only when a frame marker zero crossing occurs. This is identified as a signal FOX applied to selector 38. The selector 38 receives two kinds of zero crossing pulses, one a received signal zero crossing OX and the other a frame marker zero crossing FOX in the received signal.

The information detector 16 connected to the output of transmitter output circuit 14 determines whether or not there is information being transmitted. If information is being transmitted, then it controls selector 38 so that the FOX pulses are passed through to a divider 40. On the other hand, if no information is being transmitted, the information detector 16 will switch the selector 38 so as to pass the general zero crossing pulses OX of the received signal.

The reason for selecting either the frame marker zero crossing or the zero crossings generally is to enable the circuit to generate a clock even when there is no information being transmitted. For example, this is useful to detect a wake-up tone from a TE.

Divider 40 divides the high speed clock CLK80 (80 times the bit rate) by 80. The pulses passed by selector 38 constitute a "shock" signal which resets the divider 40 and consequently generates a reference clock, REFCLK, as the output of divider 40. This reference clock REFCLK is thus phase-synchronized with the zero crossings and at the same bit rate, 192 kilobits per second, as the signal. The reference clock REFCLK is applied to a digital phase-locked loop (DPLL) circuit 42. The DPLL 42 produces output clock PCLK, which is at the same rate as the reference clock (192 kilobits per second) but phase shifted by 90°. The clock is supplied to a phase controller 44 together with the "open window" signal from marker detector 18, the frame marker zero crossing signal FOX from the output of marker zero crossing detector 24 and the select output from information detector 16. The phase controller 44 determines the time elapsed between the "open window" signal, i.e., the transmitted frame marker, and the next frame marker zero crossing occurring in the received signal. Phase controller 44 generates a plurality of clock signals which are phase shifted by different amounts relative to clock P-CLK but at the same bit rate. In dependence upon the elapsed time measured between the two frame marker signals, phase controller 44 selects one of those phase shifted clocks as the sampling clock S-CLK to control slicer and deframer 36. This sampling clock S-CLK determines the sampling instant of the received signal which, as mentioned previously, is applied to it on line 12'. Thus, the timing recovery circuit operates to vary the sampling instant relative to the received frame marker zero crossing in dependence upon the round trip propagation time determined by measuring the interval between the detection of the transmitted frame marker and the detection of the next arriving frame marker zero crossing in the received signal.

The component parts of the circuit will now be described in more detail, starting with the voltage reference selector 30 shown in FIG. 6a and FIG. 6b. The voltage reference selector 30 comprises a set of eight comparators 50–64, respectively, (numbered evenly) each having one input connected to a respective one of eight "peak" reference voltage sources $V_{pk1}$ to $V_{pk8}$.

The other inputs of the comparators 50–64 are connected in common to the output of low pass filter 32 (FIG. 5). The outputs of the comparators 50–64 are applied to a corresponding set of qualifiers 66–80, the outputs of which are connected to an 8-to-3 line encoder 2. The truth table of 8-to-3 line encoder 82 is in Table II in Appendix I.

Figure 6A:
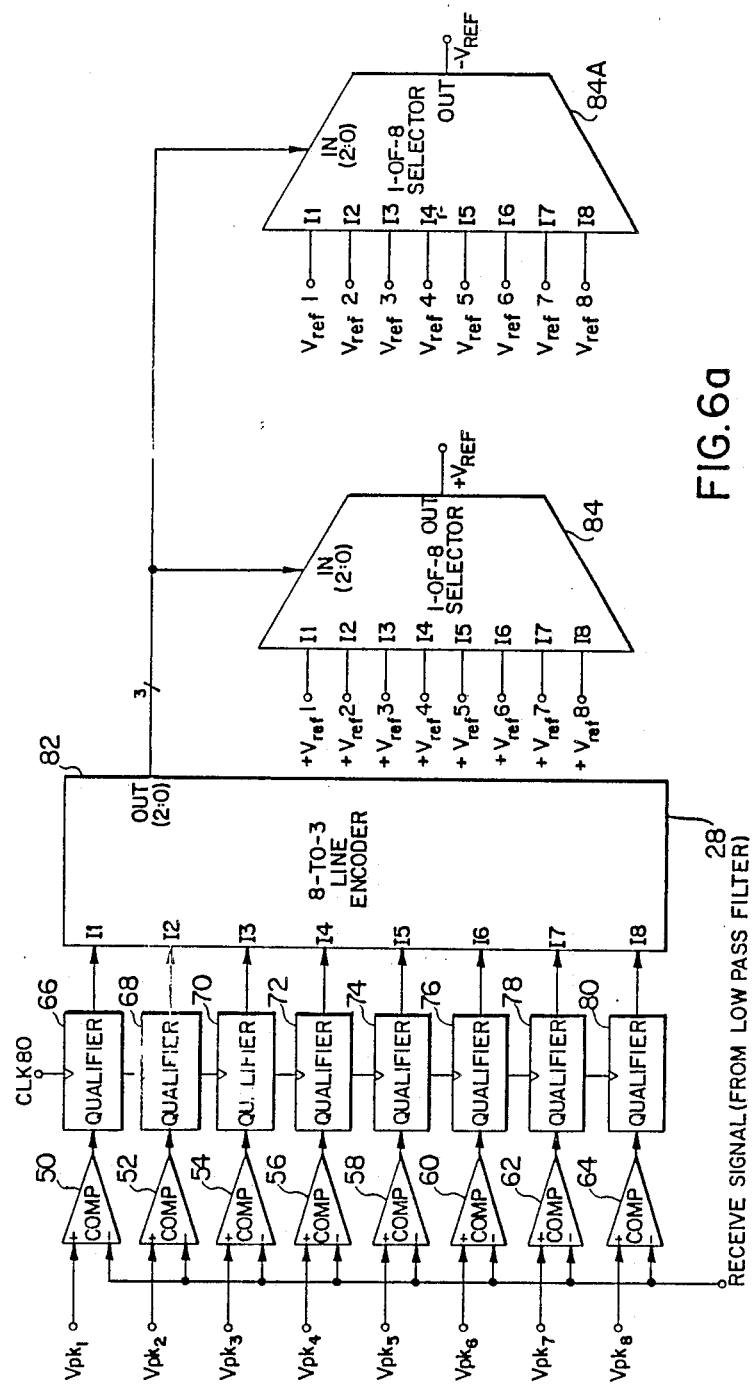
Figure 7:
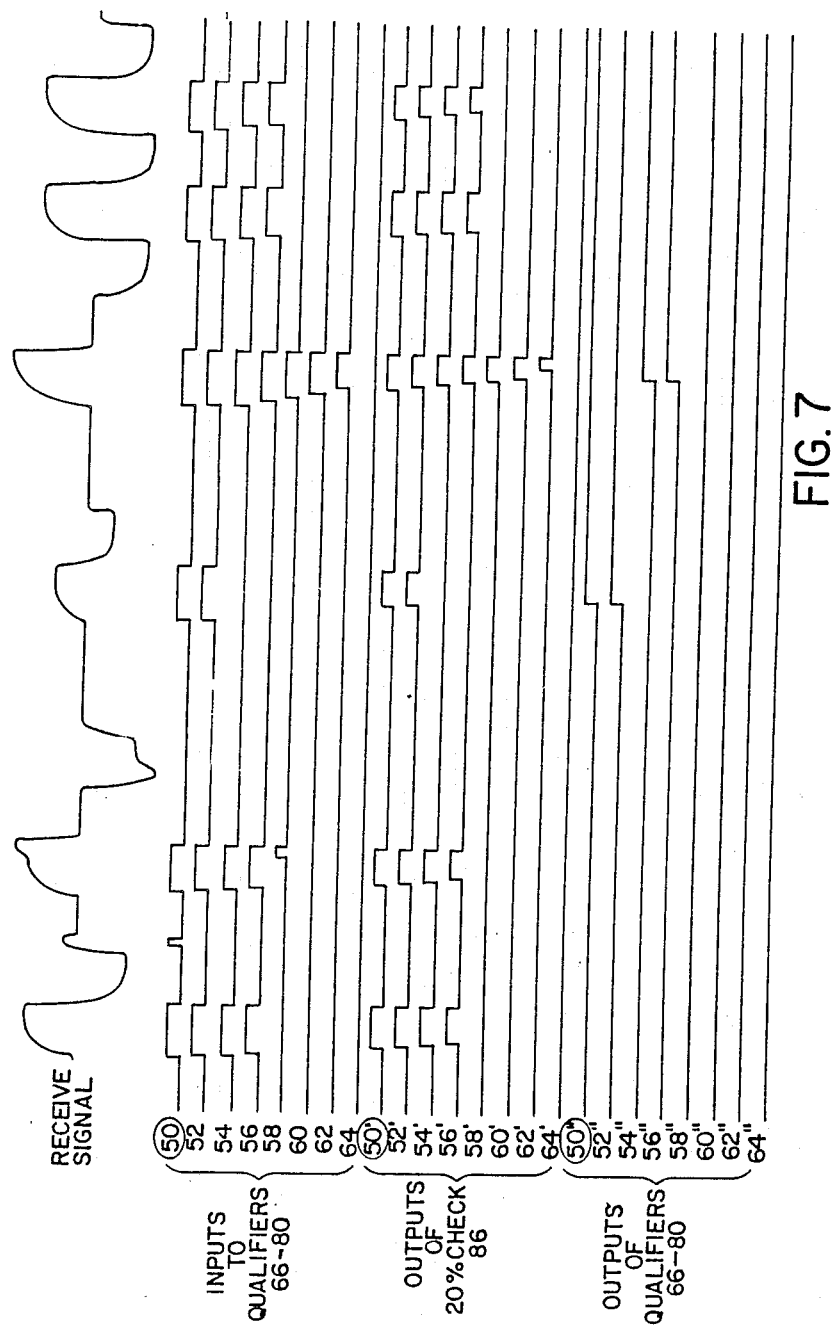
FIG. 7 is a timing diagram for the circuit of FIG. 6.

Referring to FIG. 6b, each of the qualifiers 660 (only 66 is shown) comprises a 20% checker 86 with its output coupled to the input of a density checker 88. The qualifiers 66–80 each perform two functions on the outputs of the comparators 50–64 before applying a signal to the 8-to-3 line encoder 82. First, each 20% checker 86 ensures that the respective comparator output is "true" for at least 20% of a bit period (1 microsecond). Second, each density checker 88 ensures that this result is present for a number of times in a period of time equivalent to a single frame transmission or 250 microseconds. Only when these two criteria have been successfully met, will a corresponding signal be applied to the 8-to-3 line encoder 82. The various signals in the voltage reference selector 30 and in the qualifiers 66–80 are shown in the timing diagram, FIG. 7 which indicates use of a density check of 3 for purposes of demonstration. Referring again to FIG. 6a, the 3-digit output of 8-to-3 line encoder 82 is used to control a 1-of-8 selector 84 which has its eight inputs connected to eight different voltage sources $+V_{ref\,1}$ to $+V_{ref\,8}$, respectively. The output of the 1-of-8 selector 84 is the signal $+V_{REF}$ supplied to bipolar violation detector 26 (FIG. 5).

A second 1-of-8 selector 84A also controlled by the output of 8-to-3 line encoder 82 has its inputs connected to eight voltage sources $-V_{ref\,1}$ to $-V_{ref\,8}$. This 1-of-8 selector 84A provides a negative reference voltage $-V_{REF}$ to demodulator 28. $\pm V_{ref\,1}$ to $\pm V_{ref\,8}$ ($V_{ref\,8}$ is the highest magnitude) are fixed reference voltages used selectively to position the voltage sample at different levels of the "received" signal depending upon the losses — the lower the loss, the higher the $V_{REF}$.

All o1-of-8 selectors have the same truth table — Table 2 of Appendix I.

Loss is determined by comparing the peak level of the "received" signal with the "peak" d.c. voltage references $V_{pk\,1}$ to $V_{pk\,8}$ using the comparators 50–64. $V_{pk\,1}$ is the lowest value, $V_{pk\,8}$ the highest. 8-to-3 line encoder 82 and selectors 84/84A translate the number of peak voltage reference levels exceeded into a corresponding voltage reference level $+V_{REF}$, for output to demodulator 28. The truth table employed by 1-of-8 selectors 84/84A is given in Table T2 in Appendix I.

Figure 9:
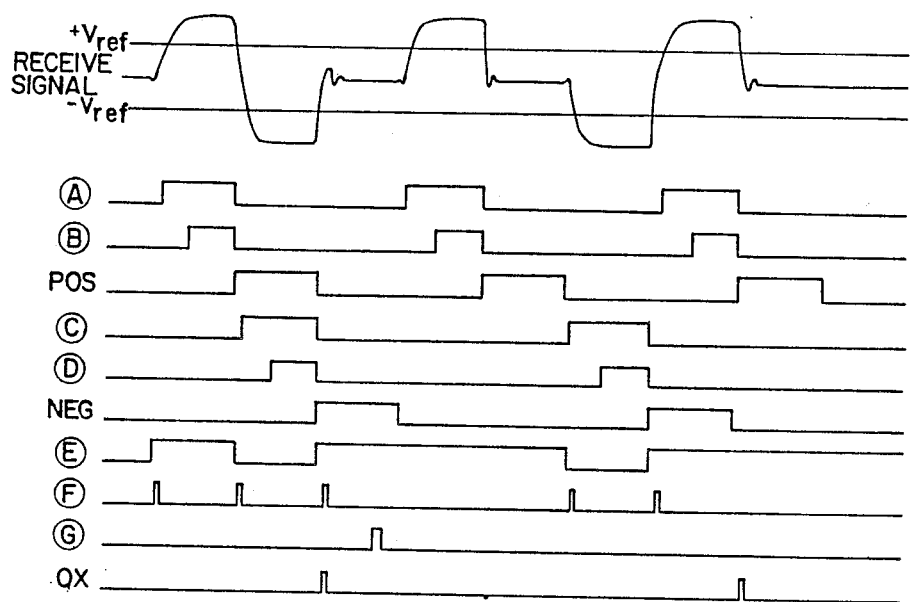
FIG. 9 is a timing diagram for the demodulator.
Figure 10:
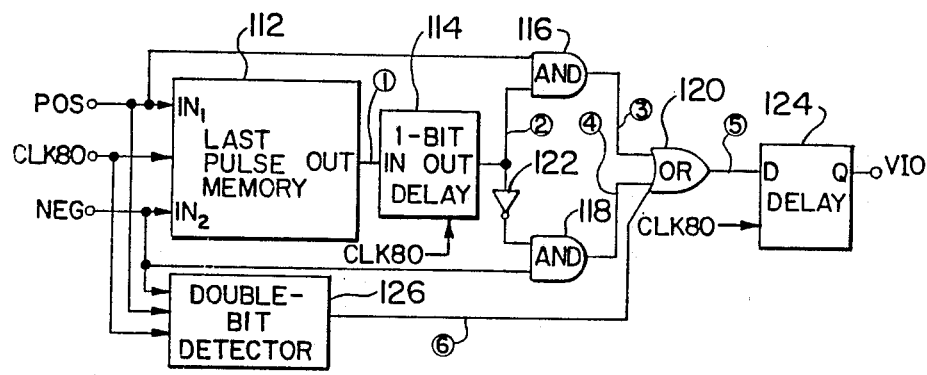
FIG. 10 is a block diagram of a bipolar violation detector.
Figure 11:
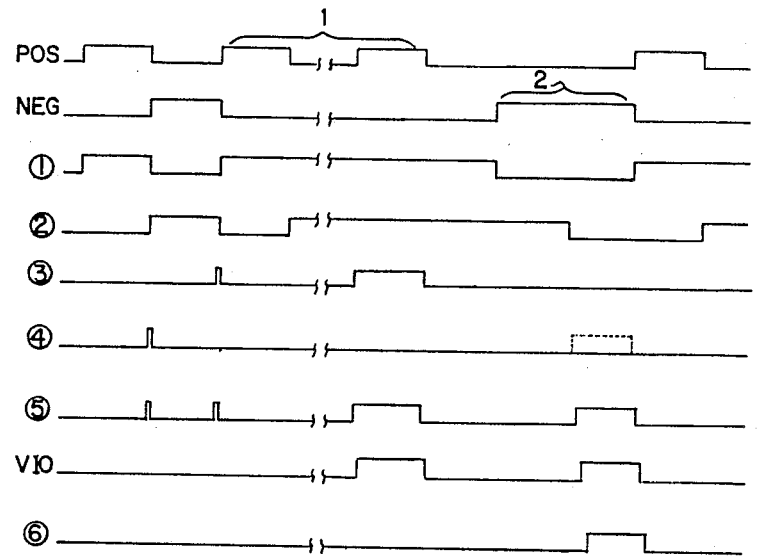
FIG. 11 is a timing diagram for the bipolar violation detector.

Referring now to FIG. 8 and the timing diagram FIG. 9, demodulator 28 comprises a "positive" comparator 92, a "negative" comparator 94, and a zero crossing comparator 96. Each of the comparators 92 and 94 has one input connected to the appropriate one of selectors 84 and 84A (FIG. 6a) to receive the voltage reference levels $+V_{REF}$ and $-V_{REF}$, respectively, and a second input connected to output of low pass filter 32 to receive the "received" signal. The "received" signal is applied to the positive input of comparator 92 and the negative input of comparator 94. The outputs of the two comparators 92 and 94 are applied to transient eliminators 98 and 100, respectively, which ensure that the signal is present for 20 percent of a bit period before a signal, positive (POS) or negative (NEG) is passed to the output of the demodulator 28. The transient eliminators 98 and 100 are connected to two delays, 102 and 104, respectively, which are provided because the zero crossing detector (also shown in FIG. 8) cannot determine the presence of a zero crossing until the bit following the zero crossing has occurred. Hence the delays 102 and 104 ensure that the positive and negative binary signals POS and NEG, respectively, will occur in correct phase relationship to the zero crossing pulse OX put out by the zero crossing detector. The zero crossing detector comprises a polarity transition detector 106 which is connected to the output of comparator 96. The output of polarity transition detector 106 is supplied to a delay 108 and a zero crossing qualifier 110. The latter receives the outputs of transient eliminators 98 and 100 at its Q1 and Q2 inputs, respectively. The two inputs Q1 and Q2 determine whether or not two bits of opposite polarity have occurred in succession. When this happens, it is qualified as a zero crossing, and qualifier 110 enables delay 108 to pass a signal from polarity transition detector 106 delayed by 1 bit period to the output line as a "zero-crossing" pulse, OX. Thus, demodulator 28 compares the received signal with the reference voltages and emits three binary signals comprising "positive" signal POS, "negative" signal NEG, and a series of short pulses OX, each pulse corresponding to a zero crossing point. The "positive" and "negative" signals are applied to the bipolar violation detector 26, which is shown in FIG. 10 and comprises a "last pulse" memory 112, a one bit delay 114, two AND gates 116 and 118, respectively, and a three-input OR gate 120 which receives the outputs of the two AND gates 116 and 118. The POS and NEG signals are applied to the IN1 and IN2 inputs, respectively, of the last pulse memory 112, which is clocked by clock CLK80, and also to the AND gates 116 and 118, respectively. The output of memory 112, delayed one bit period by delay 114, is applied directly to AND gate 116 and, via invertor amplifier 122, to AND gate 118. The gates 116 and 118 compare the polarities of the "current" pulse with the "last" pulse and determine whether or not a bipolar violation has occurred. If a violation occurs, the output of OR gate 120 will go high. This part of detector 26 detects violations (1) which are separated by one or more bit periods (see FIG. 11). Violations (2) which are end-to-end resulting in a double bit, are detected by a double bit-period detector 126, also using clock CLK80 to sample the signals POS and NEG. Double bit detector 126 comprises a counter to determine the time for which a single pulse (either polarity) is sustained. If this time exceeds, for example, 1.2 bit periods, the pulse is deemed to be "double" and hence a line code violation. Whenever a bipolar violation is detected, double-bit detector 126 supplies a corresponding pulse to OR gate 120. The output of OR gate 120 is latched by a delay 124, the Q output of which constitutes the bipolar violation signal VIO which is delayed to overlap the OX pulse and is applied to the marker zero crossing detector 24 of FIG. 5.

As mentioned previously, marker zero crossing detector 24 has windowing means triggered by a pulse on line 22 from marker detector 18. Marker zero crossing detector 24 determines that, after an "open window" signal has occurred, the next violation pulse VIO will be the frame marker of the received signal. This window will include the time period when a zero-crossing would occur. Thus, when marker zero crossing detector 24 detects the occurrence of the bipolar violation in the window, it assumes it to be the frame marker and puts out a short pulse (FOX) corresponding to the zero crossing point between the F bit and the L bit. Once it has detected a first frame marker zero crossing, marker zero crossing detector 24 "closes" the window, (i.e., the circuit is disabled until the next "open window" pulse occurs).

Figure 12:
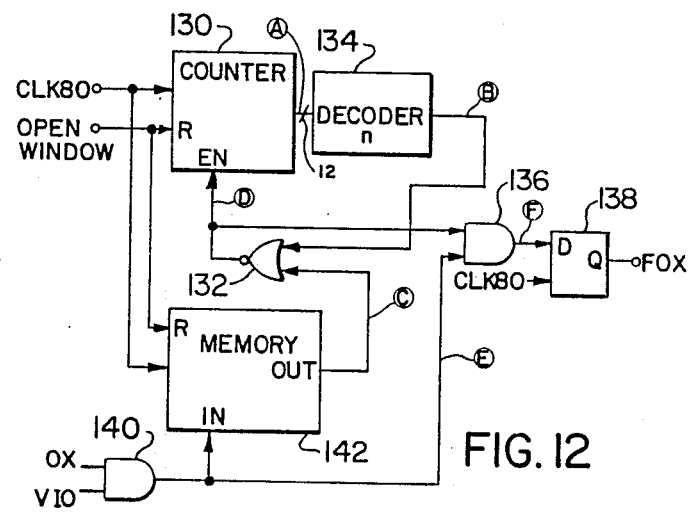
FIG. 12 (is a block diagram of a marker zero-crossing detector as used in the apparatus shown in FIG. 5.

Referring now to FIG. 12, and the associated timing diagram shown in FIG. 13, within marker zero crossing detector 24, an "open window" signal from marker detector 18 is applied to a counter 130 which is clocked by CLK80 and is enabled by the output of a NOR gate 132. Counter 130 counts to a number "n", for example 300 hexadecimal, which is equivalent to the maximum round trip delay time for which the window must be open. The output of the counter 130 is connected to a decoder 134 which is set to decode the output of counter 130 and, when it detects the number n, transmit a corresponding signal to the NOR gate 132 to disable the counter 130. The output of NOR gate 132 is also coupled to the input of an AND gate 136, the output of which is connected to the D input of a latch 138. The Q output of latch 138 is the frame marker zero crossing signal FOX.

A second input of AND gate 136 is connected to the output of an AND gate 140 which has two inputs, one connected to receive the zero crossing signal OX and the other connected to receive the bipolar violation signal VIO. When the counter 130 has reached the specified number and the output of NOR gate 132 has disabled the counter 130, the AND gate 136 is also disabled which prevents any input signal, i.e., either the zero crossing signal OX or the violation signal VIO, reaching the output of the marker zero crossing detector 24.

As mentioned previously, the first-occurring violation, followed immediately by a zero crossing, is used to determine the sampling instant. Detection of the first-occurring violation is performed by memory 142 which has a reset input connected to receive the "open window" signal and is clocked by CLK 80. The output of memory 142 is connected to the second input of NOR gate 132. A further input of the memory 142, the IN input, is connected to the output of AND gate 140. Inherent delay within the memory 142 ensures that the output of memory 142 cannot disable AND gate 136, via NOR gate 132, before the signal from AND gate 140 has reached the input of AND gate 136.

Referring to FIG. 13, which shows the various signals in the circuit of FIG. 12, and in particular the signals VIO and OX, it will be seen that when a VIO pulse occurs at the same time as an OX pulse and the counter 136 is still enabled there will be an output FOX from latch 138. On the other hand, when the OX pulse occurs without a VIO pulse, or vice versa as shown later in the diagram, there will be no corresponding output FOX from latch 138.

Referring now to FIG. 14, which shows marker detector 18 in more detail, the violation signal VIOX is applied to the input of a frame count controller 150, controlled by clock XCLK and adapted to convey the pulses VIOX from the input to either a first output 152 or a second output 154 in dependence upon the signal received at its R input.

A signal produced at the output of frame count controller 150 is not merely the VIOX signal gated from the input but rather a distinct separately-generated signal.

The clock XCLK is also applied to a counter 156, which is resettable by the signal from output 152 of frame count controller 150. The output from frame count controller 150 resets the counter 156 when a first-occurring violation arrives at the input of frame count controller 150. Thereafter, counter 156 counts the clock pulses and supplies its output count to both a "47"-decoder 158 and a "13"-decoder 160. The output of decoder 158 is supplied to an AND gate 162, the output of which is the "open window" signal on line 22 of FIG. 5. The other input of AND gate 162 is connected to the output 152 of frame count controller 150. Thus, AND gate 162 is only enabled to pass the violation signal VIOX from output 152 of frame count controller 150 if the counter 156 has reached the value 47 and caused "47"-decoder 158 to apply a signal to gate 162. In effect then, the circuit does not pass the very first frame marker violation detected but rather verifies it by detecting the occurrence of a second frame marker exactly 48 bit periods later, i.e., spaced by the duration of the frame.

The first VIOX pulse to occur will also cause the output 154 to go high enabling "13"-decoder 160. The second VIOX pulse to occur will cause output 154 to go low disabling "13"-decoder 160 from resetting frame count controller 150 when the count reaches "13". On the other hand, if a second VIOX pulse arrives before the counter 160 has reached "13", the output of "13"-decoder 160 resets the frame count controller 150 and hence counter 156. This will cause the next received VIOX pulse to be considered as the "first" violation pulse which starts the sequence again.

Figure 15:
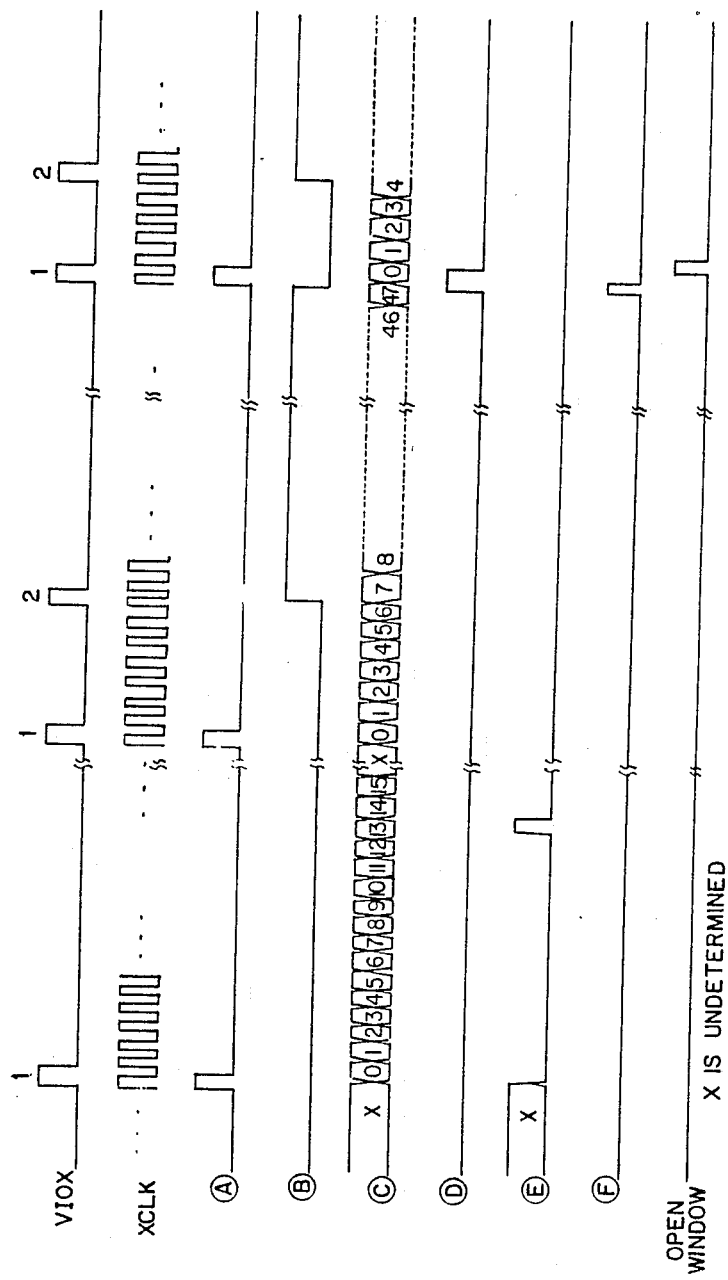
FIG. 15 is a timing diagram for the frame marker detector.

Referring to FIG. 15, and in particular the VIOX signal, the first VIOX pulse to arrive starts the timing sequence but there is no second VIOX pulse before the count of "13" (see trace C) is reached. Consequently, reset occurs to 150. Thereafter the next "first" VIOX pulse starts the sequence again and a second VIOX pulse occurs (the bits are labelled as 1 and 2). A second VIOX pulse is shown in FIG. 15 as occurring about six bit periods after the first. 47 bit periods later, as indicated by trace C, the next "first" VIOX pulse occurs which prompts the generation of the "open window" pulse as shown in the final trace "open window" of FIG. 15.

Referring now to FIG. 5 again, as mentioned previously, the "open window" signal is generated by a bipolar violation detector 20 and marker detector 18. The bipolar violation detector 20 is similar to bipolar violation detector 26 used in detecting the marker of the received signal except that the double bit detector 126 (see FIG. 10), is not required. The double bit detector 126 is not required because the bipolar violation detector 20 operates on the transmitted signal and will "see" double pulses as individual pulses due to the fact that it is being clocked by the clock XCLK in synchronism with the transmitter, which is at the bit rate.

The pulses FOX corresponding to the frame marker zero crossings are applied to one input of selector 38, operation of which is controlled by a "Select" signal from information detector 16. A second input of selector 38 is connected to the output of demodulator 28 to receive a series of pulses OX corresponding to zero crossings of the "receive" signal but which are not identified as markers necessarily.

Figure 16:
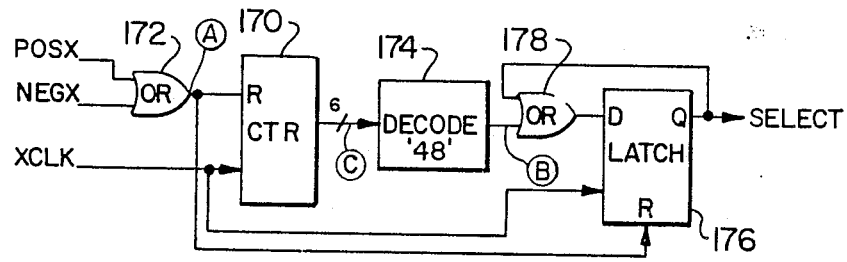
FIG. 16 is a block diagram of a circuit for detecting the absence of information or signal at the output of the transmitter shown in FIG. 5.
Figure 17:
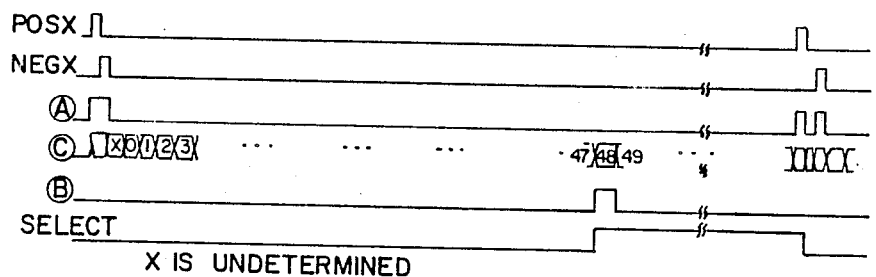
FIG. 17 is a timing diagram for the information detector of FIG. 16.

Information detector 16 is shown in more detail in FIG. 16, and its timing diagram is shown in FIG. 17. The information detector 16 comprises a counter 170 having the output of an OR gate 172 connected to its input and the positive POSX and negative NEGX signals from the output of transmitter output circuit 14 applied to the two inputs of the OR gate 172. The counter 170 has 6 outputs Q1 to Q6 all connected to a '48' decoder 174, the output of which is connected to an OR gate 178. The output of OR gate 178 is connected to the D-input of a latch 176. The Q output of latch 176 is connected to the second input of OR gate 178. The reset R input of latch 176 is connected to OR gate 172. The counter 170 and latch 176 are both clocked by the clock signal XCLK. In operation, the absence of a pulse for a continuous sequence of 48 bit periods will result in the output of latch 176, the "select" signal, going high. This results in selection of the signal OX to be passed by selector 38 to divider 40 (FIG. 5). The presence of any POSX or NEGX pulse will immediately cause the SELECT signal to go low, thus selecting the FOX signal to be passed by selector 38 to divider 40.

Referring again to FIG. 5, under the control of the "select" signal, selector 38 passes either the frame marker zero crossing pulse FOX, or the zero crossing pulse OX, as a "shock" signal to divider 40 which serves as a "digital tank circuit". In an ISDN system, there will be occasions when the transmitter does not transmit any information so there will be no frame marker on the transmit line. When that happens, information detector 16 will cause the selector 38 to apply the zero-crossing pulses OX to the "digital tank" divider 40. In that case, the sampling of the received signal will be determined solely by its zero crossing points, i.e., without reference to the transmitted signal. On the other hand, when the transmitter is transmitting information containing frame markers, information detector 16 will cause selector 38 to select the frame marker zero crossing pulses FOX for application to the "digital tank" divider 40. Divider 40 uses the high speed clock CLK80 (80 times bit rate) as the input to the first stage of its chain, and divides until the clock rate equals the bit rate. Each pulse from the selector 38 in effect resets the divider 40 to shift the phase of a 192 kb/s clock reference REFCLK so that it is in phase with the zero-crossing of the received data stream. The signal REFCLK is applied by divider 40 to digital phase locked loop (DPLL) 42. This reference clock REFCLK phase-aligns DPLL 42 to produce a clock P-CLK which is at the bit rate and synchronized with the zero crossing point and thus the "received" signal.

Figure 18:
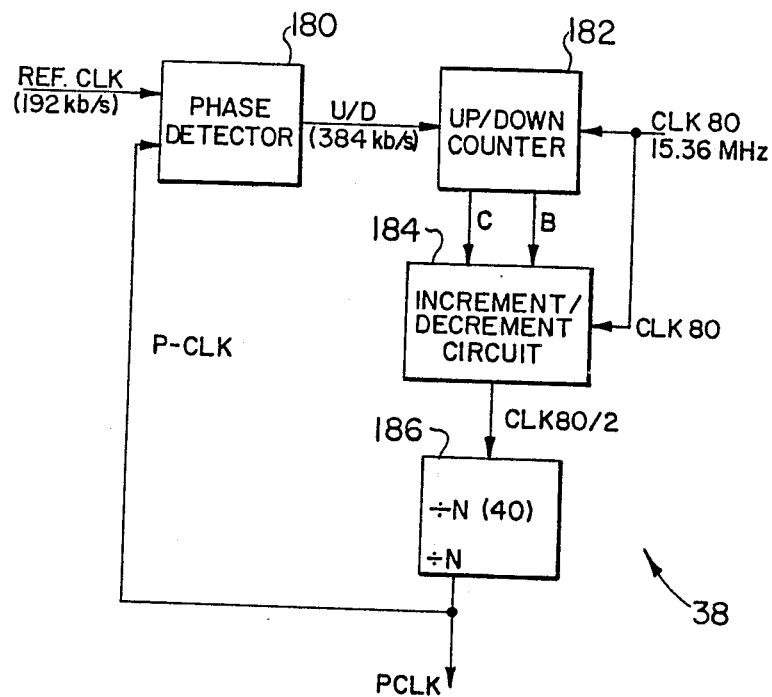
FIG. 18 is a block schematic diagram of a digital phase locked loop circuit used in the apparatus shown in FIGS. 5.

Referring now to FIG. 18, which shows the DPLL 42 in more detail, the REFCLK clock signal, at 192 kb/second, is applied to a phase detector 180, conveniently an EXCLUSIVE-OR gate which compares the REFCLK signal with the clock signal P-CLK at the output of the DPLL 42 and produces a 50 per cent duty cycle signal (U/D) — at 384 kb/second for application to up/down counter 182. When REFCLK and P-CLK are phase aligned (90° phase shifted), the "UP" count and "DOWN" count will be equal. Should imbalance occur, and the "UP" threshold of counter 182 be exceeded, a pulse will be supplied on the "carry" line C to increment/decrement circuit 184. Conversely, if the "DOWN" threshold is crossed, a pulse is supplied on the "borrow" line B to increment/decrement circuit 184. The latter receives a clock signal CLK 80, which it divides optimally by two. The "carry" and "borrow" pulses add and subtract, respectively, one ½ period of CLK 80 to or from the bit period of the clock signal CLK 80/2, i.e, phase-shift the signal by a ½ period (of CLK 80) in one direction or the other. The phase-shifted signal CLK80/2 is applied to divider 186 which divides it by N (in this case N=40) to give the clock P-CLK (192 kb/second).

Referring again to FIG. 5, the clock P-CLK is applied to the phase controller 44 which receives also the "open window" pulse output from marker detector 18, and frame marker zero crossing pulses from marker zero crossing detector 24, and the output from the information detector 16 together with a clock signal CLK80.

Figure 21:
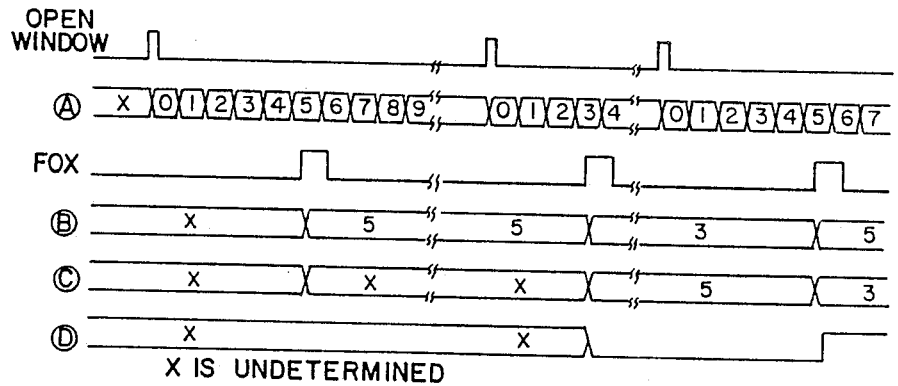
FIG. 21 is a timing diagram for the phase controller.
Figure 19:
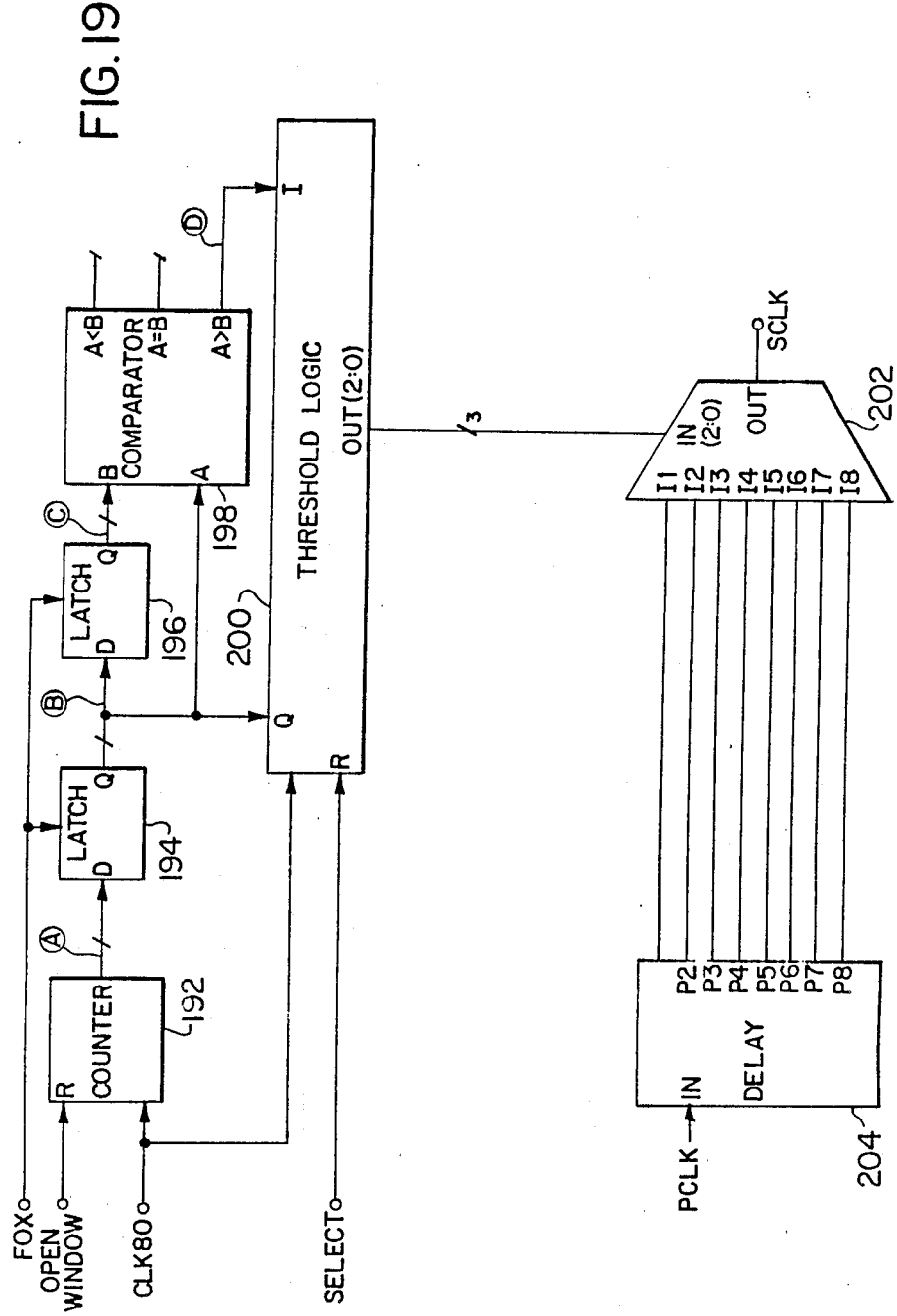
FIG. 19 is a block schematic diagram of a phase controller used in the circuit shown in FIG. 5.
Figure 20:
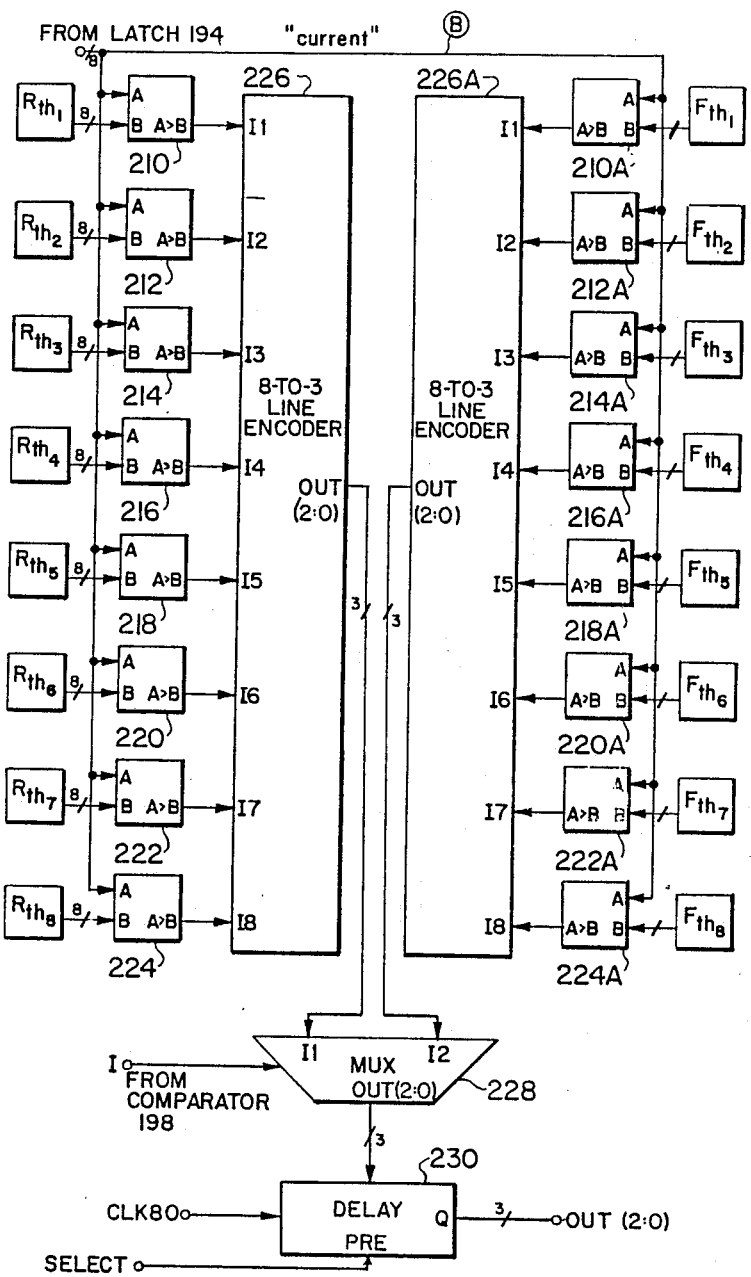
FIG. 20 is a block schematic diagram of a threshold logic part of the circuit shown in FIG. 19.
Figure 22:
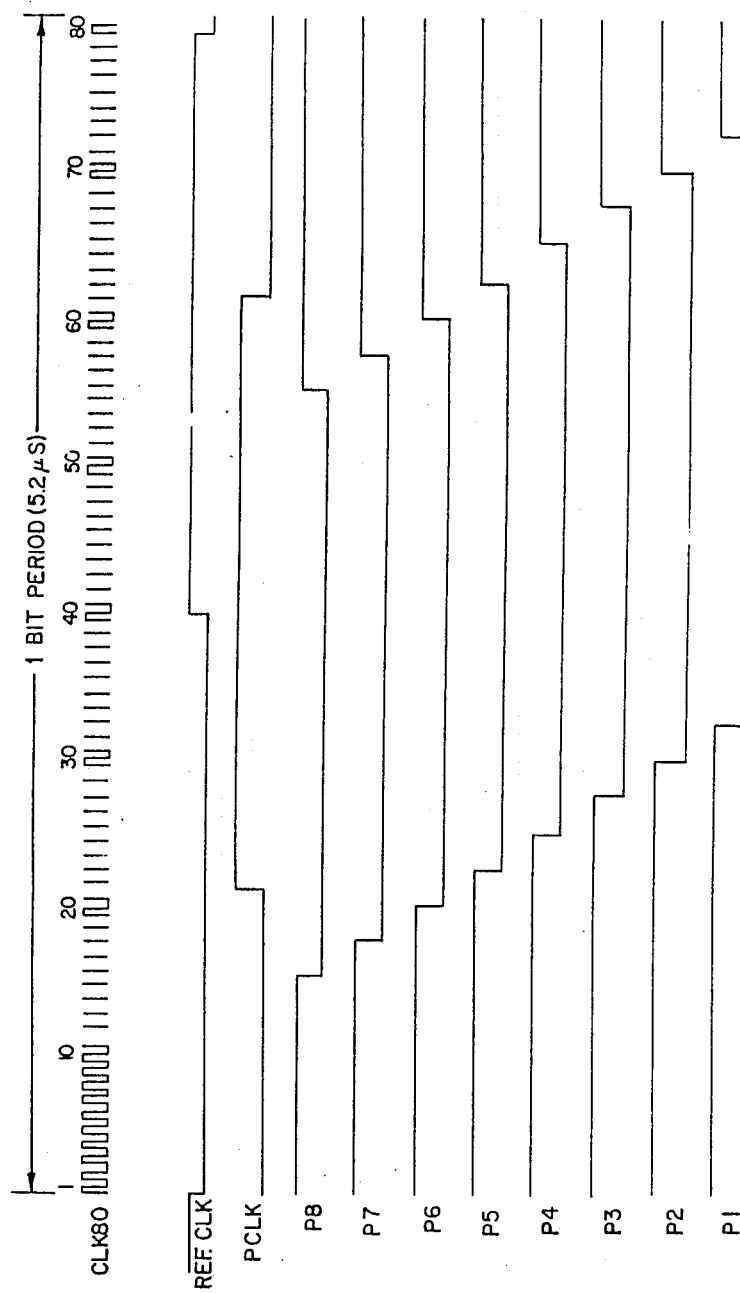
FIG. 22 is a timing diagram showing the relationships between the clock signals in the vicinity of the phase controller.

As shown in more detail in FIGS. 19 and 20, which should be considered in conjunction with the timing diagrams in FIGS. 21 and 22, the phase controller 44 includes a counter 192 and latch 194 which measure the time interval between the "open window" pulse and the frame marker zero crossing pulse FOX to determine the propagation time, i.e., go and return time, for the round trip between the network termination and the terminal equipment which sent the marker from which such frame marker zero crossing pulse FOX was derived.

This propagation time will vary according to the position of the terminal equipment with respect to the NT. Also, the shape of the received pulses on line 12 will vary according to the distance travelled and hence according to propagation time. The phase controller 44 compensates for such changes of shape when determining the sampling instant relative to the frame marker zero crossing point.

Thus, the "open window" pulse will start the counter 192. The four least significant bits $Q\phi$-Q3 are not latched by latch 194, since the extra level of resolution they provide is not needed, hence they are not used in the subsequent threshold comparison. When the frame marker zero-crossing pulse FOX occurs, the latches 194 and 196 operate, so that the Q output of latch 194 gives the "current" count (round trip delay) and the Q output of latch 196 gives the "previous" count (round trip delay). The Q outputs of latches 194 and 196 are applied to inputs A and B, respectively, of a comparator 198. The comparator 198 compares the "current" count A with the "previous" count B and supplies an "increasing" signal I when signal A is greater than B. This indicates that the round trip delay, i.e., between the "open window" pulse and the frame marker zero crossing pulse, is increasing. The "increasing" signal I and the "current" count output from latch 194 are supplied to the I and Q inputs, respectively, of a threshold logic circuit 200, which is clocked by clock signal CLK80, and resettable by the "select" signal from information detector 16. Threshold logic circuit 200 controls a 1-of-8 selector 202 to vary the phase of a sampling clock signal S-CLK. The truth table for 1-of-8 selector 202 is Table T2 in Appendix I.

The selector 202 is shown in FIG. 19 with its inputs I1-I8 connected to the respective outputs P1-P8 of delay 204. This delay 204 has its input connected to the P-CLK output of DPLL 42.

Delay 204 serves first to delay clock signal P-CLK by a fixed amount relative to the reference clock REFCLK and equal to about 67.5% of the bit period. This sets the minimum of the range of phase-adjustment which may be made to the sampling clock. Delay 204 further delays the clock signal P-CLK in steps of about 2.5% of a bit period to produce eight clock signals, P1 to P8, for application to 1-of-8 selector 202. Hence the signals P1-P8 applied to the inputs of 1-of-8 selector 202 are as shown in the timing diagram of FIG. 22. It should be noted that all eight rising edges occur within a range from about 67.5 per cent to 85 per cent of the bit period. This range has been found advantageous for reasons which were previously explained.

Thus the phase controller 44 can vary the sampling instant, relative to the frame marker zero crossing, in steps of 2.5 per cent of a bit period in proportion to the round trip delay.

The threshold logic circuit 200 shown in more detail in FIG. 20, comprises a set of eight comparators 210 to 224 each having its A input connected to the output line from latch 194 (FIG. 19) which carries the "current" count (round trip delay). The B inputs of comparators 210 to 224 are connected to 8 fixed binary thresholds $R_{th1}$ (minimum) to $R_{th8}$ (maximum), respectively. Each of these references, $R_{th1}$ to $R_{th8}$ represents a corresponding round-trip delay within the range predetermined for the network. The outputs of comparators 210 to 224 are connected to the inputs I1 to I8, respectively, of an 8-to-3 line encoder 226. The truth table for 8-to-3 line encoder 226 is Table T1 in Appendix I.

In operation, when the "current" count is greater than the particular reference $R_{th}$ associated with a comparator, the output of the comparator is "true" and the output of the 8-to-3 encoder 226 is as given by Table T1 in Appendix I. The output of the 8-to-3 line encoder 226, a three bit binary number, is supplied to one set of three (triad) input (II), of a multiplexor 228 which is controlled by the output I from comparator 198 (FIG. 19). From the output of multiplexor 228 the signal is applied to a 3 input delay 230 which is clocked by clock CLK80 and presettable by the "select" signal from the information detector 16. The delayed output of the delay 230 is the output which controls 1-of-8 selector 202 (FIG. 19). The need for a delay is so that transitions between phases occur in a stable region that will not produce glitches, i.e., the 50% point is assumed.

The "select" signal enables a "default" phase delayed SCLK to be used when no transmit signal is present.

Referring again to FIG. 20, it will be seen that the set of comparators 210 to 224 is duplicated as a set 210A to 224A connected in a similar manner to the output of latch 194 and to an 8-to-3 line encoder 226A which corresponds to 8-to-3 line encoder 226. The second set of comparators is also connected to a set of references. These references $F_{th1}$ to $F_{th8}$, like the references $R_{th1}$ to $R_{th8}$, are also binary representations of round-trip delays likely to be encountered in a particular system but their values differ from the values of $R_{th1}$ to $R_{th8}$ used with the first array. The output of 8-to-3 line encoder 226A is applied to a second triad input of multiplexor 228. The truth table for 8-to-3 line encoder 226A will be the same as that for 8-to-3 line encoder 226.

The duplicate set of comparators 210A to 224A and 8-to-3 line encoder 226A are provided to reduce "hunting" - unnecessary phase shifting of the sampling clock whenever the round-trip delay varies near a threshold.

Generally, the "R" thresholds are used when the round-trip delay is increasing and the "F" thresholds are used when the round-trip delay is decreasing. The determination of which thresholds are to be employed is controlled by the multiplexor 228 which is itself controlled by the "increasing" signal I from comparator 198 (FIG. 19) such that when the round trip delay is increasing the "r" thresholds are used, and conversely, when the round trip delay is "decreasing", the "F" thresholds are used. The "F" thresholds lie approximately half way between the corresponding "R" thresholds so that a change of at least half a threshold difference is required to change from one phase-delayed clock to an other.

The operation of this symmetrical array to eliminate "hunting" can be likened to a hysteresis circuit.

Where "hunting" is not a problem, only one set of comparators 210–224, and associated references $R_{th1}$ to $R_{th8}$, need be provided.

As was mentioned previously, the range 67.5% to 85% of the bit period set the limit of the minimum to maximum deviation of the sampling pulse relative to the frame marker zero crossing. This range is particularly advantageous in systems such as are illustrated in FIGS. 2, 3 and 4 that must support the "received" signals as depicted in FIGS. 8, 19, 209 and 21 of the ANSI specification.

It will be seen that a range from 67.5% to 85%, relative to the zero crossing will provide for satisfactory sampling and data recovery for all specified configurations.

For example, if the frame marker zero crossing is determined to occur approximately 10–11 microseconds after the transmit frame marker, this circuit would select the 85% sampling phase delayed clock for SCLK which would yield a valid sampling point for the received eye of the Short Passive Bus configurations. Conversely, if the frame marker zero crossing is found to occur in the range of 40 microseconds after the transmit frame marker, for both point-to-point and extended passive bus configurations, this circuit would select the 67.5% phase delayed clock for SCLK which would yield a valid sampling point for the received eyes. For this specification, the term "marker" is intended to cover not only a frame marker such as defined in ISDN specifications, but also zero crossings and other recurring features of a digital signal which might be detected and used in an analogous fashion to recover timing.

Various modifications are possible without departing from the scope of the invention. For example, the delay 164 (FIG. 14) might be omitted.

I claim:

1. Network apparatus for transmitting digital signals to one or more terminal equipments, and for receiving digital signals from such terminal equipments, and for receiving digital signals from such terminal equipments by way of a shared path, both the transmitted digital signals and the received digital signals comprising frames each having a marker, said network apparatus comprising:
   I. first means for detecting a marker of a frame of a digital signal transmitted by said network apparatus to said terminal equipment and generating a corresponding marker signal;
   II. second means responsive to said marker signal for detecting a received marker of a frame of a digital signal received by said network apparatus from a said terminal equipment and providing a reference signal synchronized to a specific feature of such received marker; and
   III. third means responsive to said reference signal for sampling said received digital signal at a sampling instant that is determined relative to said specific feature of said received marker.

2. Apparatus as claimed in claim 1, wherein said third means comprises means for determining the time interval between detection of the transmitted marker and detection of the received marker and means responsive to such determining means for variably delaying said sampling instant relative to said received marker in dependence upon the duration of said time interval.

3. Apparatus as claimed in claim 2, wherein said second means comprises means for providing a reference signal synchronized to said received signal, and wherein the variable delaying means comprises means for providing a plurality of clock signals phase-displaced relative to one another and to said reference clock, and selector means for selecting one of said plurality of clock signals for determining said sampling instant.

4. Apparatus as claimed in claim 3, further comprising translator means for translating said time interval to provide a selection signal to said selector means, said selection signal serving to identify which of said clock signals should be selected.

5. Apparatus as claimed in claim 3, wherein said translator means comprises a plurality of comparators, each having one input connected to a respective one of a corresponding plurality of threshold devices, such threshold devices representing different anticipated time intervals between said transmitted marker and said received marker, said comparators having their respective other inputs connected in common to the output of said time interval determining means, and third selector means responsive to said plurality of comparators to control the first-mentioned selector means.

6. Apparatus as claimed in claim 5, further comprising a second plurality of comparators, and a second plurality of threshold devices, each of said second plurality of comparators having one input connected to a respective one of said second plurality of threshold devices, said second plurality of threshold devices representing a set of different anticipated time intervals that differ from those represented by the first-mentioned plurality of threshold devices, said third selector means being responsive selectively and alternatively to the outputs of said second plurality of comparators as well as said first plurality to provide a control signal to control said selector means; and means for comparing a current output and a previous output, respectively, of said counter means and controlling operation of said third selector means so as to select the output of the first plurality (increasing) of comparators when said current output exceeds said previous output.

7. Apparatus as claimed in claim 1 or 2, further comprising means for detecting the presence or absence of information in the transmitted signal, said first means comprising means for detecting a recurrent feature of said received digital signal, not necessarily corresponding to said transmitted marker, and generating a corresponding signal, and second selector means operatively connected to said information detecting means for selecting said marker signal for synchronizing said reference signal when information is present and said corresponding signal for synchronizing said reference signal when information is absent from the transmitted signal.

8. Apparatus as claimed in claim 4, wherein said third means comprises means for providing a plurality of clock signals phase-displaced relative to one another and to said reference clock signal, and selector means responsive to said first means for selecting one of said plurality of clock signals for determining said sampling instant, said selector means being operative to select a predetermined one of said clock signals when no information is detected.

9. Apparatus as claimed in claim 8, wherein said second means comprises detection means selectively operable to detect said received marker and said first means comprises delay means for controlling said detection means to scan said received signal commencing a predetermined time after detection of said transmitted marker.

10. Apparatus as claimed in claim 9, wherein said predetermined time is substantially equal to two bit periods of said received signal.

11. Apparatus as claimed in claim 7, wherein the time interval determining means comprises counter means for counting a clock signal to provide an output representative of said time interval, and said selector means is operable to select one of said clock signals in dependence upon the value of said output.

12. Apparatus as claimed in claim 7, wherein said marker comprises a violation of the transmission code of said received signal, said specific feature comprises a zero crossing following said violation, and said recurrent feature comprises a zero crossing, and said second means comprises means for detecting zero crossings in said received signal, means for detecting violations of said received signal, and means for determining coincidence of said violation and said zero crossing and generating said marker signal relative to which the sampling instant is determined, further comprising fifth selector means for selecting either the marker signal or a said corresponding signal corresponding to a received signal zero crossing alone, to synchronize said marker signal with said received signal marker.

13. Apparatus as claimed in claim 7, wherein said second means comprises detection means selectively operable to detect said received marker and said first means comprises delay means for controlling said detection means to scan said received signal commencing a predetermined time after detection of said transmitted marker.

14. Apparatus as claimed in claim 13, wherein said predetermined time is substantially equal to two bit periods of said received signal.

15. Apparatus as claimed in claim 1, 2 or 3, wherein said marker comprises a violation of the transmission code of said received signal, said specific feature comprises a zero crossing following said violation, and said second means comprises means for detecting zero crossings in said received signal, means for detecting violations of said received signal, and means for determining coincidence of said violation and said zero crossing and generating said reference signal relative to which the sampling instant is determined.

16. Apparatus as claimed in claim 3, 4, 5, or 6, wherein the time interval determining means comprises counter means for counting a clock signal to provide an output representative of said time interval, and said selector means is operable to select one of said clock signals in dependence upon the value of said output.

17. Apparatus as claimed in claim 1, 2, 3, 4, 5 or 6, wherein said second means comprises detection means selectively operable to detect said received marker and said first means comprises delay means for controlling said detection means to scan said received signal commencing a predetermined time after detection of said transmitted marker.

18. Apparatus as claimed in claim 17, wherein said predetermined time is substantially equal to two bit periods of said received signal.

19. Apparatus as claimed in claim 2, 3, 4, 5 or 6, wherein said variable delaying means is adapted to vary the sampling instant in a range that is from 35 to 95 per cent of the bit period.

20. Apparatus as claimed in claim 19, wherein said range is from 60 to 90 per cent of the bit period.

21. Apparatus as claimed in claim 19, wherein said range is from 65 to 85 per cent of a bit period.

22. Apparatus as claimed in claim 19, wherein said range is from 80 to 95 per cent of a bit period.

23. Apparatus as defined in claim 2, 3, 4, 5 or 6, wherein said variable delaying means is adapted to vary the sampling instant in a range that is less than one-half of a bit period.

24. Apparatus as claimed in claim 23, wherein said range is in the second half of the bit period.

25. A method of recovering timing in a system in which digital signals are transmitted by network apparatus to one or more terminal equipments, and digital signals are received by said network apparatus from such terminal equipments by way of a shared path, both the transmitted digital signals and the received digital signals comprising frame each having a marker, said method comprising the steps of:

I. detecting a marker of a frame of a digital signal transmitted by said network apparatus to said terminal equipment;

II. in response to detection of said marker in the transmitted frame, detecting a corresponding marker of a frame of a digital signal received by said network apparatus from said terminal equipment; and providing a reference signal synchronized to a specific feature or such marker; and III. in response to said reference signal, sampling said received digital signal at a sampling instant that is determined relative to said specific feature of said received marker.

26. A method as claimed in claim 25, wherein the step of sampling said received signal comprises determining the time interval between detection of the transmitted marker and detection of the received marker and, responsive to such determination, delaying said sampling instant relative to said received marker in dependence upon the duration of said time interval.

27. A method as claimed in claim 26, wherein the delaying step comprises the steps of providing a plurality of clock signals phase-displaced relative to one another and to said reference signal, and selecting one of said plurality of clock signals for determining said sampling instant.

28. A method as claimed in claim 27, wherein the third step includes providing a plurality of clock signals phase-displaced relative to one another and to said reference cLock signal, and selecting one of those clock signals for determining the sampling instant, the selection being of a predetermined one when no information is being transmitted.

29. A method as claimed in claim 28, wherein said step of detecting said corresponding marker comprises the step of scanning said received signal commencing a predetermined time after detection of said transmitted marker.

30. A method as claimed in claim 29, wherein said predetermined time is substantially equal to two bit periods.

31. A method as claimed in claim 25 or 26, further comprising the steps of detecting a recurrent feature of said received digital signal not necessarily corresponding to said transmitted marker, and generating a corresponding signal, detecting the presence or absence of information in the transmitted signal, and selecting the marker signal to synchronize said reference signal when information is being transmitted and the said corresponding signal as said reference signal when information is not being transmitted.

32. A method as claimed in claim 31, wherein said marker comprises a violation of the transmission code of said received signal, and said specific feature comprises a zero crossing following said violation, and said recurrent feature comprises a zero crossing, and said step of detecting the marker comprises the steps of detecting zero crossings in said received signal, detecting violations of said received signal, determining coincidence of a said violation and a said zero crossing, generating said reference signal to correspond to such coincident zero crossing, and selecting either the marker signal or a said corresponding signal corresponding to zero crossings alone to synchronize said marker signal with said received signal marker.

33. A method as claimed in claim 31, wherein said step of detecting said corresponding marker comprises the step of scanning said received signal commencing a predetermined time after detection of said transmitted marker.

34. A method as claimed in claim 33, wherein said predetermined time is substantially equal to two bit periods.

35. A method as claimed in claim 25, 26 or 27, wherein said marker comprises a violation of the transmission code of said received signal, said specific feature comprises a zero crossing following said violation, and said step of detecting the marker comprising the steps of detecting zero crossings in said received signal, detecting violations of said received signal, determining coincidence of a said violation and a said zero crossing, and generating said reference signal to correspond to such coincident zero crossing.

36. A method as claimed in claim 27, further comprising the step of translating said count to provide a selection signal to identify which of said clock signals should be selected.

37. A method as claimed in claim 36, wherein the translating step comprises effecting a plurality of comparisons, between said time interval and a plurality of thresholds, such thresholds representing different anticipated time intervals between detection of said transmitted marker and detection of said received marker, and encoding the results of said plurality of comparisons to provide said selection signal.

38. A method as claimed in claim 37, further comprising the step of effecting a second plurality of comparisons using a second plurality of thresholds, said second plurality of thresholds representing a set of different anticipated time intervals that differ from those represented by the first-mentioned plurality of thresholds, selecting either the results of said second plurality of comparisons or the said results of the first plurality of comparisons to provide said selection signal to identify which of said clock signals should be selected; and comparing a current value and a previous value, respectively, of said time interval, said selection of either the first comparison results or the second comparison results then selecting the first signal when said current value exceeds said previous value.

39. A method as claimed in claim 27, 28, 36, 37 or 38, wherein said time interval determination comprises the steps of counting a clock signal to provide an output representative of said time interval, and said selecting of one of said clock signals is in dependence upon the value of said output.

40. A method as claimed in claim 25, 26, 27, 36, 37 or 38, wherein said step of detecting said corresponding marker comprises the step of scanning said received signal commencing a predetermined time after detection of said transmitted marker.

41. A method as claimed in claim 40, wherein said predetermined time is substantially equal to two bit periods.

42. A method as claimed in claim 26, 27, 36, 37 or 38, wherein said variable delaying step varies the sampling instant 43. A method as claimed in claim 42, wherein said range is from 65 to 85 per cent.

44. A method as claimed in claim 42, wherein said range is from 80 to 95 per cent. in a range from 35 to 95 per cent of a bit period.

45. A method as claimed in claim 26, 27, 36, 37 or 38, wherein said variable delaying step varies the sampling instant in a range that is less than one-half of a bit period of said received signal.

46. A method as claimed in claim 45, wherein said range is second half of the bit period.

47. A method as claimed in claim 46, wherein said range is from 60 to 90 percent of the bit period.

* * * * *